United States Patent
Boukari et al.

(10) Patent No.: US 7,307,056 B2
(45) Date of Patent: Dec. 11, 2007

(54) DISINFECTING PEROXOSILICATED COMPOUND WITH SCALE PREVENTIVE EFFECT, PREPARATION METHOD AND USE THEREOF

(75) Inventors: Morou Boukari, Toulouse (FR); Marc Auriol, Flourens (FR); Sophie Auriol, Flourens (FR)

(73) Assignee: EOTEC, Bessieres (FR)

( * ) Notice: Subject to any disclaimer, the term of this patent is extended or adjusted under 35 U.S.C. 154(b) by 198 days.

(21) Appl. No.: 10/450,664

(22) PCT Filed: Dec. 13, 2001

(86) PCT No.: PCT/FR01/03974

§ 371 (c)(1),
(2), (4) Date: Nov. 28, 2003

(87) PCT Pub. No.: WO02/48030

PCT Pub. Date: Jun. 20, 2002

(65) Prior Publication Data

US 2005/0261153 A1     Nov. 24, 2005

(30) Foreign Application Priority Data

Dec. 15, 2000  (FR) .................................. 00 16367

(51) Int. Cl.
*C11D 9/36*       (2006.01)
*C11D 9/42*       (2006.01)
*C11D 7/38*       (2006.01)
*C01B 15/14*      (2006.01)

(52) U.S. Cl. ...................... 510/466; 510/247; 510/309; 422/28; 252/175; 106/287.1; 210/759; 423/324; 423/326

(58) Field of Classification Search .............. 510/247, 510/309, 466; 422/28; 252/175; 106/287.1; 210/759; 423/324, 326
See application file for complete search history.

(56) References Cited

U.S. PATENT DOCUMENTS 5,820,841 A * 10/1998 Chen et al. ................. 423/305
6,399,559 B1    6/2002 Elms et al.
6,605,580 B2 * 8/2003 Bijl et al. .................... 510/286

FOREIGN PATENT DOCUMENTS

| | | |
|---|---|---|
| CH | 406123 | 1/1966 |
| DE | 19714440 | 10/1998 |
| EP | 0831056 | 3/1998 |
| GB | 761043 | * 11/1956 |
| JP | 52019199 | 2/1977 |

OTHER PUBLICATIONS

Patent Abstracts of Japan, Jun. 8, 1977, vol. 001, No. 059 (C-015).

* cited by examiner

*Primary Examiner*—Brian Mruk
(74) *Attorney, Agent, or Firm*—Millen, White, Zelano & Branigan, P.C.

(57) ABSTRACT

The invention concerns a peroxosilicated, optionally phosphatized, disinfecting compound with scale preventive effect obtained by reacting an alkaline or alkaline-earth metasilicate with an active oxygen-releasing compound, for example potassium monopersulphate and/or oxygen peroxide, in inert medium. The compound can be stabilized with sodium hexametaphosphate. Copper and aluminium in salt form can be encapsulated or complexed with the metasilicate so that the resulting peroxosilicated compound can be used for its disinfecting, scale preventive, anticorrosive, flocculating and algicidal properties for more than three weeks.

6 Claims, No Drawings

DISINFECTING PEROXOSILICATED COMPOUND WITH SCALE PREVENTIVE EFFECT, PREPARATION METHOD AND USE THEREOF

The invention relates to a method for treating water with a view to disinfecting it. In particular, it relates to the treatment of private or commercial swimming pools or other bodies of water, but can also be applied to the treatment of water for industrial use, hot or cold drinking water or municipal sewage. The invention encompasses a novel disinfecting peroxosilicate compound with an anti-limescale and anticorrosive effect for carrying out the envisaged method, and to a method for its preparation.

Said peroxosilicate compound can also be phosphated.

The prior art is illustrated by patents DE-A-19714440 and JP-52019199.

European patent EP-A-0 831 056 describes compounds of the type $Na_2SiO_3$, $nH_2O_2$ or of the type $PO_4^{3-}$, $nH_2O_2$; $P_2O_7^{4-}$, $nH_2O_2$; $P_3O_{10}^{5-}$, $nH_2O_2$; $PO_4H^{2-}$, $nH_2O_2$; $PO_4H_2^{-}$, $nH_2O_2$.

Those compounds are used as medical instrument sterilizing agents.

British patent GB-A-761043 discloses metasilicate and hydrogen peroxide type compounds $Na_2SiO_3$, $nH_2O_2$ in the presence of an aluminum-based catalyst. The gel obtained is treated with a surfactant then with a drying agent to obtain a solid gel. That product is used as a textile stain removing agent.

Swiss patent CH-A-406123 also describes metasilicate type compounds, $nH_2O_2$, in the presence of an agent that accelerates the formation of the complex obtained, namely a salt of a metal from groups 1 to 3.

A surfactant is added to the gel obtained along with a water-absorbing agent.

The compounds obtained are used as an animal and plant fibre whitening agent.

The products mentioned in said patents solve the problem of the instability of oxygen-releasing compounds on storage. Prepared in the presence of metasilicates and thus in a basic medium, said products are not stable in water, however (see GB-A-761043, page 1, lines 21-28). Thus, their disinfecting power is lower and of shorter duration and decomposition of the hydrogen peroxide in a basic medium leads to the release of ionic species $OH^-$, resulting in an increase in pH in water.

Further, the metasilicate is corrosive in a basic medium.

There is a variety of types of methods for disinfecting water to eliminate microorganisms (bacteria, viruses . . . ); the term "bactericide" is used to describe this microorganism destruction or deactivation effect. However, when treating swimming pool water, there is currently no disinfection method which combines all of the following desirable qualities:
1) effectiveness and persistence of the disinfection effect, guaranteeing a long term effect (to avoid the need for frequent human intervention);
2) non-modification of the physico-chemical characteristics of the water (pH, clarity, non-odorous and non-aggressive character as regards man);
3) absence of decomposition products (which may become noxious by becoming concentrated or modifying the kinetics of the bactericidal effect);
4) safety and ease of use, absence of risk to the environment and non-corrosive nature as regards facilities (compatibility with the pipework, coatings, . . . );
5) lowest possible treatment costs.

Currently, the most widely used swimming pool water treatment method consists of using the highly effective bactericidal effect of chlorine by mixing a chlorine-containing compound with the swimming pool water either in the form of a gas (commercial pools) or in the liquid or solid form.

In addition to its well known environmental risks, the worst drawbacks of chlorine treatment methods are:
for gaseous or liquid chlorine, in the risks of use, the absence of persistence, the corrosive nature of the treated water (which are rendered acidic with gaseous chlorine and alkaline in the case of liquid chlorine);
for solid chlorine, in the relatively low persistence (requiring frequent top-ups), the appearance of noxious decomposition products (ions, in particular calcium ions), the corrosive nature of the treated water (pH modification) and, in the case of an excess, a modification of the physico-chemical characteristics of the water (aggressive towards the mucous membranes, olfactive properties, and non-neutral).

This list of disadvantages results in a tendency to reduce or stop the use of chlorine-containing compounds in the treatment of swimming pool water.

A further method that is essentially used in commercial pools or to treat drinking water consists of using ozone gas. That method is satisfactory as regards points 2), 3) and 4) above; however, it suffers from the very substantial drawback of having no persistence, so any bacterial pollution following a treatment can develop rapidly; that method necessitates continuous treatment, which limits it to professional facilities.

A further treatment method consists of using hydrogen peroxide as the bactericide; however, the major drawback with hydrogen peroxide treatment lies in its very low persistence (4 to 5 days when treating a swimming pool) and all known methods employing hydrogen peroxide as a bactericide combine the compound with other compounds (in particular a biguandine salt) to increase its persistence and require a relatively high concentration in water (100 ppm) to obtain a satisfactory bactericidal effect; however, the products that are currently combined with hydrogen peroxide (biguanidine salt) increase the persistence in medium proportions (10 to 20 days depending on temperature); further, the associated products have their own drawbacks as they cause the appearance of organic decomposition products (which result in a supplemental consumption of peroxide) and are completely incompatible with all other treatment products: thus, to initiate a peroxide/biguanidine treatment, a pool which has previously been treated with chlorine has first to be completely emptied and carefully washed (with emptying and washing costing of the order of one year's treatment). Further, the hydrogen peroxide/biguanidine salt pair is costly and in particular exceeds the admissible price and in particular that of treatment with chlorine.

Thus, there is currently no water disinfection method that combines the above qualities:
1) effectiveness and persistence of the bactericidal effect;
2) non-modification of the physico-chemical characteristics of the water;
3) absence of decomposition products;
4) safety and ease of use as regards users, equipment and the environment;
5) price compatible with the treatment of swimming pool water.

It should be emphasized that this problem with swimming pool water disinfection has existed for many years and has not yet been satisfactorily resolved despite its economic importance (the existence of water parks and their future development). Currently, the agent generally used is chlorine despite its major drawbacks and its poor image as regards the environment.

The present invention proposes to indicate a novel method for disinfecting water that combines the qualities mentioned above. The method of the invention is of particular application to treating the water of commercial and private swimming pools but can also be applied to any type of water treatment (industrial water, drinking water, municipal sewage, industrial reservoirs, . . . ).

One aim of the invention is to provide a treatment method based on a compound that releases active oxygen that takes a direct bactericidal role, i.e., supplied in a concentration that is suitable to provide good bactericidal efficacy as a function of existing conditions (temperature, agitation, pool use) that benefits from excellent persistence (more than 20 days) and does not produce any decomposition products.

A further aim of the invention is the safety and ease of use and an absence of a corrosive nature.

A further aim of the invention is to indicate a method with the lowest possible cost price, which is substantially lower than that of any method employing chlorine (currently the cheapest).

Still further, the invention aims to provide a disinfecting composition with a prolonged bacteridal effect, containing a peroxosilicate compound, optionally phosphated.

Still further, the invention aims to provide a composition that can be applied to any type of water, knowing that currently available products only have a significant and durable effect when the water to be treated has a hardness of less than 15 degrees French (water hardness testing).

Yet still further, the invention aims to propose the preparation of the composition of the invention in its solid or liquid form, which can be used directly in water and in particular in a swimming pool.

More precisely, the invention concerns a disinfecting peroxosilicate compound with an anti-limescale effect that is at least partially soluble in water, characterized in that it is obtained at least in part by reacting at least one alkali metal or alkaline-earth metal metasilicate, preferably a sodium or potassium metasilicate pentahydrate, with at least one compound that releases active oxygen at a substantially neutral pH.

The term "neutral pH" means a pH that is generally in the range 6 to 8.0, advantageously in the range 6.5 to 7.5, and preferably in the range 6.8 to 7.4, normally obtained by adding acid sodium sulfate, phosphoric acid or monosodium phosphate, to the preparation medium, preferably monosodium phosphate, which also contributes to increasing the rate of the reaction resulting in the compound obtained and to render it more stable. That compound then becomes silicated and phosphated in the presence of molecules containing phosphorus.

It has been observed that the bactericidal effect of the product obtained persists longer because of a higher percentage of active oxygen. Further, and surprisingly, the product obtained has been shown to have an anti-limescale and anticorrosive effect.

In accordance with one characteristic of the invention, the active oxygen releasing compound is selected from the group formed by hydrogen peroxide (and its aqueous solutions), alkali metal (sodium, potassium) or alkaline-earth metal monopersulfate, acid potassium monopersulfate, sodium peroxodisulfate, sodium peroxide, lithium peroxide, barium peroxide, sodium peroxoborate and potassium peroxodisulfate; preferably, said active oxygen releasing compound is hydrogen peroxide or potassium monopersulfate.

In accordance with a further characteristic of the invention, it has been shown that the active oxygen releasing compound can be stabilized and the function of the final product can be prolonged by reacting said compound directly with at least one agent for stabilizing said compound, prior to reacting it with the alkali or alkaline-earth metasilicate. The same effect can be obtained if the metasilicate is reacted with said stabilizing agent then the product obtained is brought into contact with the oxygen releasing compound.

The oxygen releasing compound stabilizing agent can, for example, be:
  sodium or potassium hexametaphosphate;
  a polyquaternary ammonium salt, in particular poly(hexamethylammonium) chloride, poly[oxyethylene-(dimethylimino)ethylene-(dimethylimino)-ethylene dichloride], dodecamethylenedimethyliminochloride, 1,3-diazo -2,4-cyclopentadiene mixed with 1-chloro-2,3-epoxypropane; and
  a monomeric quaternary ammonium salt.

Preferably, sodium or potassium hexametaphosphate is used which, like the other molecules containing phosphorus, contributes to supplying the phosphorus of the final product of the invention.

The peroxosilicate compound, optionally phosphated, obtained by in situ reaction, absorbed by one of the constituents of the mixture and/or formed by a physico-chemical bond in the mixture of constituents, has an anti-limescale effect and an anti-corrosive effect, which can be five times higher than that of the starting products. Said silicated and phosphated peroxo compounds not only prevent corrosion of facilities or the deposition of limescale in said facilities, but also allow rust or limescale deposits that already exist in those facilities to be removed simply by circulating the water. The basic constituents of the reactions alone could not simultaneously produce those effects.

Preparation of the compound of the invention employing the two reactions discussed above can be catalyzed by an aluminum salt, for example aluminum sulfate, which can also flocculate colloidal or suspended particles in the water for subsequent removal by filtration.

It is also possible to add a copper salt, copper sulfate, to the preparation as an algicide.

Active oxygen releasing compounds such as potassium monopersulfate and hydrogen peroxide, for example, are known to decompose rapidly in water in the presence of copper or aluminum. Said decomposition takes place even in the solid state for potassium monopersulfate and in the concentrated liquid state for hydrogen peroxide.

Within the context of the invention, to avoid the rapid decomposition of potassium monopersulfate or hydrogen peroxide for example, in the solid state or in solution, the copper and aluminum can be encapsulated in the solid state.

In accordance with one feature of the invention, the copper can be encapsulated by reacting the copper salt, for example copper sulfate pentahydrate, with sodium or potassium metasilicate in the molten state. In the same manner, the aluminum salt, for example aluminum sulfate, can be encapsulated by reaction with the metasilicate in the molten state.

In a variation, the copper and aluminum can be complexed in the liquid state, preferably in a highly concentrated medium and can even be supersaturated in the presence of sodium or potassium metasilicate pentahydrate, optionally sodium hexametaphosphate selected, for example, as the stabilizing agent, and monosodium phosphate. In these two forms (encapsulation or complexing), the copper and aluminum do not have a decomposing effect on oxygen-containing compounds. In water, the encapsulated or complexed compounds progressively release the metals on demand, copper for its algicide effect and aluminum for its catalytic and flocculating effect.

Further, the service life of the oxygen releasing compound, in particular the monopersulfate or hydrogen peroxide, will be increased as a result of this slow and progressive release of the metals.

The peroxosilicated and phosphated compounds of the invention fulfill several functions when all of the ingredients of the preparation have interacted:

- disinfection by progressive release of active oxygen into the water;
- long-term stabilization to release active oxygen for at least 3 weeks;
- self-regulation of the pH due to a buffer action, said products being effective over a wide pH range (6 to 8.0);
- anti-limescale effect. They can also reduce the hardness of the water by complexing the calcium or by forming non-adhesive limescale which can be removed by simple filtration. As an example, for treated water with an original hardness of 60 degrees French, after 3 weeks the hardness of the water had reduced by about 30%. The products of the invention can thus be used to treat very hard water, over 60 degrees French, which is not possible with oxygen-containing products currently available on the market which cannot be used effectively if the water hardness is over 15 degrees French;
- anticorrosive effect: This effect is more marked than with sodium metasilicate alone;
- algicide;
- flocculation of suspended or colloidal material and thus ease of removal by filtration in the circuit.

The peroxosilicate and phosphated compound can be prepared using the following proportions by weight:

In the solid state, for example:

Advantageously, potassium monopersulfate is used as the active oxygen-releasing compound.

| potassium monopersulfate | 1% to 80% |
| sodium metasilicate pentahydrate | 1% to 40% |
| monosodium phosphate | 0.1% to 15% |

At least one of the constituents cited in the description can be added in the following proportions:

| sodium hexametaphosphate | 0.1% to 15% |
| aluminum sulfate | 0.1% to 16% |
| copper sulfate $CuSO_4, 5H_2O$ | 0.2% to 10% |

Preferably, the following steps are employed:
a) the copper sulfate pentahydrate and the monosodium phosphate are reacted first (reaction time 15 minutes to 6 hours). Stable cuprophosphate complexes are thus formed, which avoids precipitation of copper in the metal form in the encapsulation reactions;
b) the sodium metasilicate pentahydrate is melted by heating (temperature 70° C. to 100° C. in general);
c) the molten metasilicate is mixed with the cuprophosphate complex from step a) to obtain an encapsulated product;
d) the encapsulated product obtained in c) is then reacted with a mixture containing an alkali metal monopersulfate, for example potassium monopersulfate, aluminum sulfate, the selected stabilizing agent, for example sodium hexametaphosphate, to obtain a final product in the solid form, having the seven functions cited above. The reaction is highly exothermic and releases heat. The temperature rises to more than 100° C., releasing steam. This final product is constituted by two portions: a soluble active portion and an insoluble neutral portion. This insoluble neutral portion is constituted by a microporous structure which carries out a supplemental function of filtering microparticles contained in the water to be treated.

In the liquid state, for example

The active oxygen-releasing compound is an aqueous solution of hydrogen peroxide and/or potassium monopersulfate.

a) hydrogen peroxide and/or potassium monopersulfate is/are mixed with the monosodium phosphate, optionally with water, in the following proportions by weight:

| potassium monopersulfate | 1% to 20% |
| hydrogen peroxide (35%) | 10% to 60% |
| monosodium phosphate | 0.1% to 15% |
| demineralized water | 0 to 60% | to produce an ensemble A of products.

b) the following components are reacted in the liquid state in the following proportions by weight:

| sodium metasilicate | 1% to 40% |
| copper sulfate pentahydrate | 0.2% to 10% |
| aluminum sulfate | 0.1% to 16% |
| sodium hexametaphosphate | 0.1% to 15% |
| demineralized water | 20% to 85% |

A violet product B is obtained after reacting for 10 minutes to 5 hours; none of the starting compounds has this colour.

c) ensemble A is reacted with product B when required for use, in the following proportions by weight of A:B of 1:1 to 20:1.

Finally, the invention concerns the use of the peroxosilicate compound in a method for treating water, for example a swimming pool, for its disinfecting, anti-limescale and anticorrosive effect in particular. In accordance with the method of use, a quantity of the peroxosilicate compound in the range 5 to 100 g per cubic metre of water is mixed with the water in a closed circuit, the concentration of the oxygen releasing compound ($H_2O_2$ measurement) is measured regularly, and the peroxosilicate compound is added when the concentration of oxygen releasing compound drops below a certain threshold (1 mg of $H_2O_2$ per liter of water, for example).

It has been observed that it is only necessary to introduce the compounds of the invention, preferably in the liquid form, once every three weeks to permanently establish the functions mentioned above.

The following examples illustrate the invention.

EXAMPLE 1

An experimental swimming pool was treated using the peroxosilicate and phosphated compound in the liquid form prepared using the following proportions by weight:
Product A: the monopersulfate, hydrogen peroxide, monosodium phosphate and demineralized water were mixed in the following proportions by weight:

| | |
|---|---|
| potassium monopersulfate | 9% |
| hydrogen peroxide (35%) | 30% |
| monosodium phosphate | 6% |
| demineralized water | 55% |

Product B: the pentahydrated metasilicate, copper sulfate pentahydrate, sodium hexametaphosphate and demineralized water were mixed in the following proportions by weight:

| | |
|---|---|
| sodium metasilicate pentahydrate | 25% |
| copper sulfate pentahydrate | 5.5% |
| sodium hexametaphosphate | 9.5% |
| demineralized water | 54.5% |
| aluminum sulfate | 5.5% |

The final peroxosilicate phosphated compound was obtained by reacting product A with product B in a proportion by volume of 5:1.

The pH of the reaction was 6.7.

Swimming Pool Characteristics Before Adding the Peroxosilicate and Phosphated Compound Prepared in Accordance with the Invention:
  pool equipped with two skimmers with two plastic baskets;
  drain plug and inlet grid showing traces of rust;
  sand filter with iron casing with rust on interior;
  limescale deposits on walls of pool, in sand and in the skimmers;
  pH of water 7.6 (+/−0.1 pH unit);
  water turbidity: 2.5 NTU;
  total hardness TH°: 58.5° F.;
  water temperature: 27° C.;
  microbiological characteristics of water:
    nuclei at 37° C./ml: 300
    total coliforms, 37° C./100 ml: 100;
    heat tolerant coliforms, 44° C./100 ml: 154
    total staphylococcus and micrococcus/100 ml: 208;
    pathogenic staphylococcus/100 ml: 70

This pool was treated with the peroxosilicate compound of the invention in an amount of 60 g per 1000 liters of water to be treated.

To verify the anticorrosive activity of the compound, one of the plastic baskets of the skimmer was replaced with an iron basket.

The anticorrosive efficacy was evaluated by visual observation of the condition of the iron basket, the drain plug, the grid and the interior of the sand filter.

Swimming Pool Characteristics After Adding the Peroxosilicate and Phosphated Compound in an Amount of 60 g per 1000 Liters of Water to be Treated:

The long term stabilization of the released active oxygen was evaluated by measuring the concentration of $H_2O_2$ in the water.

Day 1 (2 h after adding compound):
  pH: 7.6 (+/−0.1 pH units);
  turbidity: 1.5 NTU;
  phosphates: 1 mg/l;
  hardness: 58.5° F. TH;
  $Cu^{2+}$: 0.15 mg/l;
  temperature: 27° C.;
  $H_2O_2$ measured: 25 mg/l;
  trace of rust existing on the drain plug, the grid and inside the sand filter: present;
  no corrosion on iron basket;
  lime deposit existing on pool walls, in skimmers and in sand: present;
  microbiological characteristics:
    nuclei at 37° C./ml: 30
    total coliforms, 37° C./100 ml: 0;
    heat tolerant coliforms, 44° C./100 ml: 0
    total staphylococcus and micrococcus/100 ml: 6;
    pathogenic staphylococcus/100 ml: 0.

Day 21 (3 weeks after adding peroxosilicate and phosphated compound prepared in accordance with the invention):
  pH: 7.65 (+/−0.1 pH units);
  turbidity: <1 NTU;
  TH hardness of water: 35° F.;
  water temperature: 27.5° C.;
  $H_2O_2$ measured: 2 mg/l;
  $Cu^{2+}$: 0.08 mg/l;
  phosphates: 0.3 mg/l;
  no algae;
  rust on the drain plug, the grid and inside the sand filter had disappeared;
  lime deposit existing on pool walls, in pipework and in sand had disappeared;
  no corrosion on iron basket;
  microbiological characteristics:
    nuclei at 37° C./ml: 10
    total coliforms, 37° C./100 ml: 0;
    heat tolerant coliforms, 44° C./100 ml: 0
    total staphylococcus and micrococcus/100 ml: 3;
    pathogenic staphylococcus/100 ml: 0.

No variation in the pH was observed despite the non-addition of pH correctors. The water turbidity had reduced and was below 1 without adding flocculant.

The water hardness had reduced by at least 40% and the limescale deposits on the pool walls, in the skimmers, in the pipework and in the sand had disappeared.

The rust traces had completely disappeared from the drain plug, the grid and from the interior of the sand filter, and there was no corrosion in the iron skimmer basket.

The bacteriological analysis showed that the water satisfied the official French standards for pool water.

EXAMPLE 2

Comparative

The same test was carried out on a control pool under the same conditions:

Potassium monopersulfate and hydrogen peroxide (respective proportions by weight of 9% and 30%) were mixed in the pool. The total $H_2O_2$ concentration was: 25 mg/l.
  the released active oxygen persistence was less than seven days;

neither the limescale nor the rust deposits disappeared;
the iron basket corroded and rust appeared;
the pH increased to 7.9.

EXAMPLE 3

The three constituents below were reacted for twenty minutes in the following proportions by weight:

| | |
|---|---|
| sodium monopersulfate | 55% |
| sodium metasilicate pentahydrate, molten | 6% |
| monosodium phosphate | 9% |
| water | 30% |

The pH of the reaction was 6.2.

A solid silicated and phosphated product was obtained which was introduced using water-permeable pouches in an amount of 40 g/m$^3$, into the skimmers of the experimental pool of Example 1 the water of which had a hardness of 58.5° F. Substantially the same disinfecting properties as those described form Example 1 were observed. After fifteen days, the water hardness had reduced by 30% and the limescale and rust deposits on the pool walls had disappeared. The pH of the pool water remained at 7.6.

The treatment of the invention is thus effective as follows:
on a bactericidal level, with a persistence of up to at least 3 weeks;
on a pH stabilization level;
on a flocculation level (improved water turbidity);
on the long term active oxygen stabilization level;
on the algicidal level;
on the anti-limescale and anti-corrosive level.

EXAMPLE 4

Comparative

A test was carried out on the control pool containing the same water as in Example 1.

The following were reacted in the following proportions by weight:

| | |
|---|---|
| sodium monopersulfate | 55% |
| sodium metasilicate | 6% |
| water | 39% |

The pH was 9.5

The product obtained was used under the same treatment conditions as those described for Example 3.

The pool characteristics after adding the product were as follows:

| | time (h) | | | | | | |
|---|---|---|---|---|---|---|---|
| | 1 | 2 | 4 | 6 | 8 | 12 | 24 |
| pH | 8.1 | 8.1 | 8.2 | 8.2 | 8.3 | 8.3 | 8.4 |
| H$_2$O$_2$ (mg/l) | 24 | 18 | 14 | 12 | 10 | 7.5 | 0.1 |
| nuclei 37° C./ml | 300 | 300 | 300 | 300 | 300 | 300 | 300 |
| total coliforms 37° C./100 ml | 100 | 100 | 100 | 96 | 96 | 97 | 99 |
| heat tolerant coliforms 44° C./100 ml | 154 | 151 | 154 | 143 | 143 | 147 | 147 |

-continued

| | time (h) | | | | | | |
|---|---|---|---|---|---|---|---|
| | 1 | 2 | 4 | 6 | 8 | 12 | 24 |
| staphylococcus and micrococcus/100 ml | 208 | 208 | 208 | 207 | 207 | 207 | 207 |
| pathogenic staphylococcus/100 ml | 70 | 70 | 70 | 70 | 70 | 70 | 70 |

No bactericidal effect was established when the pH of the reaction was basic.

The invention claimed is:

1. A method for preparing a peroxosilicate compound, comprising contacting at least one active oxygen releasing compound, in a reaction medium optionally in the presence of at least one agent for stabilizing the active oxygen releasing compound, under suitable conditions with at least one sodium or potassium metasilicate at a pH in the range of 6 to 8, and wherein a copper salt in an encapsulated or complexed form is introduced by reaction with the sodium or potassium metasilicate.

2. A method for preparing a peroxosilicate compound, comprising contacting at least one active oxygen releasing compound, in a reaction medium in the presence of at least one agent for stabilizing the active oxygen releasing compound, under suitable conditions with at least one sodium or potassium metasilicate at a pH in the range of 6 to 8, and wherein said agent for stabilizing the active oxygen releasing compound comprises:
   sodium or potassium hexametaphosphate; and
   a polyquaternary ammonium salt, and/or a monomeric quaternary ammonium salt.

3. A method for preparing a peroxosilicate compound, comprising contacting at least one active oxygen releasing compound, in a reaction medium in the presence of at least one agent for stabilizing the active oxygen releasing compound, under suitable conditions with at least one sodium or potassium metasilicate at a pH in the range of 6 to 8, and wherein the proportions by weight of constituents in the reaction medium are as follows:
   as the oxygen releasing compound, 1% to 80% potassium monopersulfate and/or hydrogen peroxide
   alkali metal or alkaline-earth metal 1% to 40% metasilicate,
   oxygen releasing compound stabilizing 0.1% to 15% agent, said reaction medium further comprising
   aluminum sulfate 0.1% to 16%
   copper sulfate pentahydrate 0.2% to 10%
   monosodium phosphate 0.1% to 15%
   and optionally, water.

4. In a method for treating water to disinfect the water and provide an anti-limescale and anticorrosive effect, comprising adding a disinfecting composition to the water, the improvement wherein the disinfecting composition comprises a disinfecting composition comprising a peroxosilicate compound with an anti-limescale effect that is at least partially soluble in water, obtained at least in part by reacting in a reaction medium at least one alkali metal or alkaline-earth metal metasilicate, with at least one compound that releases active oxygen in the presence of a sufficient amount of phosphoric acid, monosodium phosphate or acid sodium sulfate provide the reaction medium with a pH in the range of 6 to 8.0, and wherein said peroxosilicate compound is phosphated and functions as flocculating agent, algicide, long-term stabilizer of active oxygen and pH stabilizer.

5. A method according to claim 2, wherein the agent for stabilizing the active oxygen releasing compound comprises:
poly(hexamethylammonium) chloride, poly[oxyethylene-(dimethylimino)ethylene -(dimethylimino)ethylene dichloride], dodecamethylenedimethyliminochloride or 1,3-diazo-2,4-cyclopentadiene mixed with 1-chloro-2,3-epoxypropane.

6. A method according to claim 3, wherein the agent for stabilizing the oxygen releasing compound comprises sodium hexametaphosphate.

* * * * *